(12) United States Patent
Fujiwara et al.

(10) Patent No.: US 12,476,254 B2
(45) Date of Patent: Nov. 18, 2025

(54) BINDER FOR SOLID-STATE SECONDARY BATTERY, SLURRY FOR SOLID-STATE SECONDARY BATTERY, METHOD FOR FORMING LAYER FOR SOLID-STATE SECONDARY BATTERY AND SOLID-STATE SECONDARY BATTERY

(71) Applicant: DAIKIN INDUSTRIES, LTD., Osaka (JP)

(72) Inventors: Kae Fujiwara, Osaka (JP); Takaya Yamada, Osaka (JP); Takahiro Furutani, Osaka (JP); Junpei Terada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 72 days.

(21) Appl. No.: 18/119,083

(22) Filed: Mar. 8, 2023

(65) Prior Publication Data
US 2023/0223542 A1 Jul. 13, 2023

Related U.S. Application Data

(63) Continuation of application No. PCT/JP2021/030584, filed on Aug. 20, 2021.

(30) Foreign Application Priority Data

Sep. 9, 2020 (JP) .................. 2020-151525

(51) Int. Cl.
*H01M 4/62* (2006.01)
*H01M 10/0525* (2010.01)
*H01M 10/0562* (2010.01)

(52) U.S. Cl.
CPC ....... *H01M 4/623* (2013.01); *H01M 10/0525* (2013.01); *H01M 10/0562* (2013.01); *H01M 2300/0071* (2013.01)

(58) Field of Classification Search
CPC ........... H01M 4/62; H01M 4/623; H01M 4/60
See application file for complete search history.

(56) References Cited

U.S. PATENT DOCUMENTS

2007/0259271 A1 11/2007 Nanno et al.
2011/0318638 A1 12/2011 Koh et al.
(Continued)

FOREIGN PATENT DOCUMENTS

CN 102308417 A 1/2012
CN 106062032 A 10/2016
(Continued)

OTHER PUBLICATIONS

Machine Translation of: JP 2014-078400 A, Hasegawa et al., May 1, 2014.*

(Continued)

*Primary Examiner* — Kenneth J Douyette
(74) *Attorney, Agent, or Firm* — Sughrue Mion, PLLC

(57) ABSTRACT

An oxide-based solid-state secondary battery and a binder for a solid-state secondary battery using an oxide-based solid electrolyte that contains a fluorine-containing polymer including a vinylidene fluoride unit and a fluorinated monomer unit other than the vinylidene fluoride unit. The fluorinated monomer unit is at least one copolymerization unit (A) selected from a monomer unit having a structure represented by formula (1) and a monomer unit having a structure represented by formula (2):

(1)

(Continued)

-continued

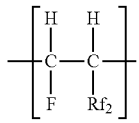

(2)

wherein $Rf_1$ and $Rf_2$ are each a linear or branched fluorinated alkyl or fluorinated alkoxy group with 1 to 12 carbon atoms, which optionally contains an oxygen atom between carbon-carbon atoms when the number of carbon atoms is 2 or more.

13 Claims, 1 Drawing Sheet

(56) References Cited

U.S. PATENT DOCUMENTS

| | | | |
|---|---|---|---|
| 2013/0274420 A1* | 10/2013 | Morita | C08F 214/22 526/255 |
| 2014/0370351 A1 | 12/2014 | Kwon et al. | |
| 2015/0017532 A1 | 1/2015 | Iguchi et al. | |
| 2015/0044561 A1* | 2/2015 | Kose | C08K 3/20 252/182.1 |
| 2016/0028108 A1 | 1/2016 | Hashimoto et al. | |
| 2016/0226096 A1 | 8/2016 | Tsujiko et al. | |
| 2017/0346095 A1 | 11/2017 | Nomura | |
| 2019/0074543 A1 | 3/2019 | Houjyou et al. | |
| 2020/0243862 A1 | 7/2020 | Hosoda et al. | |
| 2021/0376319 A1 | 12/2021 | Shinoda et al. | |

FOREIGN PATENT DOCUMENTS

| | | | |
|---|---|---|---|
| CN | 110854429 A | | 2/2020 |
| EP | 3492500 A1 | | 6/2019 |
| JP | 2007-005279 A | | 1/2007 |
| JP | 2012-512264 A | | 5/2012 |
| JP | 2013-219016 A | | 10/2013 |
| JP | 2013-229337 A | | 11/2013 |
| JP | 2014078400 A | * | 5/2014 |
| JP | 2015-518643 A | | 7/2015 |
| JP | 2016-164888 A | | 9/2016 |
| JP | 2017-157300 A | | 9/2017 |
| JP | 2017-188379 A | | 10/2017 |
| JP | 2019-046721 A | | 3/2019 |
| TW | 201923003 A | | 6/2019 |
| WO | 2010/101304 A1 | | 9/2010 |
| WO | 2015/049996 A1 | | 4/2015 |
| WO | 2016/076371 A1 | | 5/2016 |
| WO | 2020/071336 A1 | | 4/2020 |

OTHER PUBLICATIONS

International Search Report for PCT/JP2021/030584, dated Oct. 12, 2021.
Taiwanese Office Action dated Aug. 15, 2023 in Taiwanese Application No. 110132825.
International Preliminary Report on Patentability with the translation of Written Opinion dated Mar. 7, 2023 from the International Bureau in International Application No. PCT/JP2021/030584.

* cited by examiner

BINDER FOR SOLID-STATE SECONDARY BATTERY, SLURRY FOR SOLID-STATE SECONDARY BATTERY, METHOD FOR FORMING LAYER FOR SOLID-STATE SECONDARY BATTERY AND SOLID-STATE SECONDARY BATTERY

CROSS-REFERENCE TO RELATED APPLICATIONS

This application is a Rule 53(b) Continuation of International Application No. PCT/JP2021/030584 filed Aug. 20, 2021, which claims priority based on Japanese Patent Application No. 2020-151525 filed Sep. 9, 2020, the respective disclosures of all of which are incorporated herein by reference in their entirety.

TECHNICAL FIELD

The present disclosure relates to a binder for a solid-state secondary battery, a slurry for a solid-state secondary battery, a method for forming a layer for a solid-state secondary battery, and a solid-state secondary battery.

BACKGROUND ART

Solid-state secondary batteries have been studied as highly safe batteries. Known solid electrolytes used in solid-state secondary batteries are classified as sulfide- and oxide-based, and solid-state secondary batteries formed using these solid electrolytes have been studied. Of these batteries, it is known that, in an oxide-based solid-state secondary battery, a binder-free slurry is prepared, and the slurry is heated to a high temperature of 400° C. or more and sintered, thereby forming an electrode layer and a solid electrolyte layer.

Patent Literature 1 discloses use of a binder comprising a fluorine-based copolymer containing tetrafluoroethylene in an electrolyte layer on the positive electrode side of a solid-state secondary battery.

Patent Literature 2 discloses use of polyvinylidene fluoride as a binder in a positive electrode material layer at the positive electrode and in a negative electrode material layer at the negative electrode of a solid-state secondary battery.

Patent Literatures 3 and 4 disclose a slurry for forming a layer that constitutes a solid-state secondary battery.

Further, in recent years, solid-state secondary batteries are expected to be large-sized.

Patent Literature 5 discloses a method for producing an electrode assembly using polyvinylidene fluoride as a binder without firing at a high temperature.

Patent Literatures 6 and 7 disclose a binder or a binder solution comprising a fluorine-containing polymer containing a polymerization unit based on vinylidene fluoride and a polymerization unit based on a monomer containing an amide group or an amide bond, and further discloses that the fluorine-containing polymer optionally contains a polymer unit based on 2,3,3,3-tetrafluoropropene.

CITATION LIST

Patent Literature

Patent Literature 1: WO 2015/049996
Patent Literature 2: Japanese Patent Laid-Open No. 2016-164888
Patent Literature 3: Japanese Patent Laid-Open No. 2019-46721
Patent Literature 4: Japanese Patent Laid-Open No. 2007-5279
Patent Literature 5: Japanese Patent Laid-Open No. 2017-188379
Patent Literature 6: Japanese Patent Laid-Open No. 2013-229337
Patent Literature 7: Japanese Patent Laid-Open No. 2013-219016

SUMMARY

The present disclosure provides a binder for a solid-state secondary battery that uses an oxide-based solid electrolyte comprising a fluorine-containing polymer comprising a vinylidene fluoride unit and a fluorinated monomer unit other than the vinylidene fluoride unit, wherein the fluorinated monomer unit is at least one copolymerization unit (A) selected from the group consisting of a monomer unit having a structure represented by formula (1) and a monomer unit having a structure represented by formula (2):

[Formula 1]

(1)

(2)

wherein $Rf_1$ and $Rf_2$ are each a linear or branched fluorinated alkyl or fluorinated alkoxy group with 1 to 12 carbon atoms, which optionally contains an oxygen atom between carbon-carbon atoms when the number of carbon atoms is 2 or more.

DESCRIPTION OF EMBODIMENTS

Figure 1:
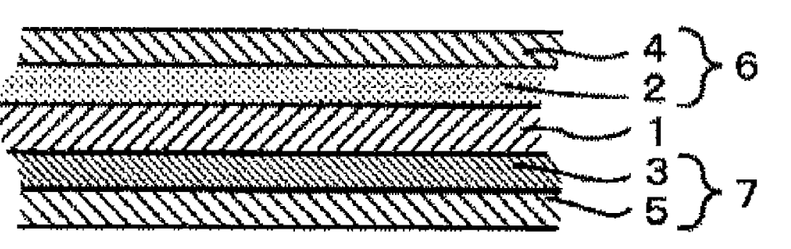
The FIGURE is a diagram showing one exemplary laminated structure of a solid-state secondary battery of the present disclosure.

The present disclosure will be hereinafter described in detail.

The present disclosure provides a binder used in a solid-state secondary battery.

The methods for forming a layer constituting a solid-state secondary battery by high-temperature firing without using a binder or without leaving a binder require high-temperature heating for sintering, and such a step causes an increase in cost in the large-area battery production. For this reason, a technique of preparing a slurry and applying and drying the slurry has been devised as a method for molding at a low temperature, but polyvinylidene fluoride, a comparatively inexpensive common polymer, when used as a binder gelates in a slurry, hence problematic. A binder once gelates fails to provide a homogeneous slurry and consequently cannot function as a binder.

Such a gelation is most likely to occur in a slurry that uses a positive electrode active material containing lithium hydroxide. Some oxide-based solid electrolytes are presumably unstable to moisture, change to lithium hydroxide when reacting to moisture in the air, and become an alkaline component that causes gelation.

Gelation has been known to occur even when producing a slurry used in the production of an electrode material, and many attempts have been made to improve it.

However, the issue of gelation that has been studied was mostly originated from an electrode active material. For this reason, the problem has been tackled by suitably selecting a combination of an electrode active material and a binder to be used mostly for a slurry for electrode preparation.

The present disclosure improves points that are the major problem in slurries containing an oxide-based solid electrolyte used in solid-state batteries.

Specifically, it is presumed that the oxide-based solid electrolyte used in solid-state batteries easily generates lithium hydroxide, and such a lithium hydroxide causes gelation. Therefore, the issue of gelation caused by interaction to an oxide-based solid electrolyte used in solid-state batteries is completely different from the conventional issue of gelation originated from an electrode active material. Thus, a solution technique will also be completely different from the conventional issue of gelation originated from an electrode active material.

The present disclosure has a feature of using a binder comprising a fluorine-containing polymer having specific chemical structures in the production of an electrode and an electrolyte layer. The present disclosure uses, as a binder, a fluorine-containing polymer comprising a vinylidene fluoride unit and a fluorinated monomer unit other than the vinylidene fluoride unit, wherein the fluorinated monomer unit is at least one copolymerization unit (A) selected from the group consisting of a monomer unit having a structure represented by formula (1) below and a monomer unit having a structure represented by formula (2) below. Use of such a binder eliminates the issue of gelation, and a slurry can suitably be used. This enables the formation of an electrode and an electrolyte layer having satisfactory performance inexpensively.

[Formula 2]

(1)

(2)

wherein $Rf_1$ and $Rf_2$ are each a linear or branched fluorinated alkyl group or fluorinated alkoxy group with 1 to 12 carbon atoms, which optionally contains an oxygen atom between carbon-carbon atoms when the number of carbon atoms is 2 or more.

The binder of the present disclosure comprises a fluorine-containing polymer comprising a vinylidene fluoride unit and a fluorinated monomer unit other than the vinylidene fluoride unit, wherein the fluorinated monomer unit is at least one copolymerization unit (A) selected from the group consisting of a monomer unit having a structure represented by the formula (1) above and a monomer unit having a structure represented by the formula (2) above. Such a polymer is preferable in the point of less likely causing the issue of gelation over an extended period of time.

The polymer comprising at least one copolymerization unit (A) selected from the group consisting of a monomer unit having a structure represented by the formula (1) above and a monomer unit having a structure represented by the formula (2) above has excellent alkaline resistance and thus can provide a slurry nonreactive to an oxide-based solid electrolyte. The polymer also provides the advantage of having excellent performance such as heat resistance, flexibility, oxidation resistance, and reduction resistance.

In the monomer constituting the fluorinated monomer unit represented by the formula (1), $Rf_1$ is a linear or branched fluorinated alkyl with 1 to 12 carbon atoms, or a linear or branched fluorinated alkoxy group with 1 to 12 carbon atoms. The fluorinated alkyl group and the fluorinated alkoxy group may each contain an oxygen atom (—O—) between carbon-carbon atoms when the number of carbon atoms is 2 or more.

The fluorinated alkyl group of $Rf_1$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_1$, a hydrogen atom may be substituted with a substituent other than a fluorine atom; however, the fluorinated alkyl group of $Rf_1$ preferably does not contain a substituent other than a fluorine atom.

Alternatively, the fluorinated alkoxy group of $Rf_1$ may be a partially fluorinated alkoxy group in which a portion of the hydrogen atoms attached to the carbon atom are substituted with fluorine atoms, or may be a perfluorinated alkoxy group in which all of the hydrogen atoms attached to the carbon atom are substituted with fluorine atoms. In the fluorinated alkoxy group of $Rf_1$, a hydrogen atom may be substituted with a substituent other than a fluorine atom; however, the fluorinated alkoxy group of $Rf_1$ preferably does not contain a substituent other than a fluorine atom.

The number of carbon atoms in $Rf_1$ is preferably 1 to 10, more preferably 1 to 6, still more preferably 1 to 4, and particularly preferably 1.

$Rf_1$ is preferably a group represented by the formula:

-$(Rf_{11})m$-$(O)p$-$(Rf_{12}$-$O)n$-$Rf_{13}$ wherein $Rf_{11}$ and $Rf_{12}$ are each independently a linear or branched fluorinated alkylene group with 1 to 4 carbon atoms; $Rf_{13}$ is a linear or branched fluorinated alkyl group with 1 to 4 carbon atoms; p is 0 or 1; m is an integer from 0 to 4; and n is an integer from 0 to 4.

The fluorinated alkylene group of $Rf_{11}$ and $Rf_{12}$ may be a partially fluorinated alkylene group in which a portion of the hydrogen atoms attached to the carbon atom are substituted with fluorine atoms, or may be a perfluorinated alkylene group in which all of the hydrogen atoms attached to the carbon atom are substituted with fluorine atoms. In the fluorinated alkylene group of $Rf_{11}$ and $Rf_{12}$, a hydrogen atom may be substituted with a substituent other than a fluorine atom; however, the fluorinated alkylene group of $Rf_{11}$ and $Rf_{12}$ preferably does not contain a substituent other than a fluorine atom. $Rf_{11}$ and $Rf_{12}$ may each be the same or different in each occurrence.

Examples of the fluorinated alkylene group of $Rf_{11}$ include —CHF—, —$CF_2$—, —$CH_2$—$CF_2$—, —CHF—$CF_2$—, —$CF_2$—$CF_2$—, —$CF(CF_3)$—, —$CH_2$—$CF_2$—$CF_2$—, —CHF—$CF_2$—$CF_2$—, —$CF_2$—$CF_2$—$CF_2$—, —$CF(CF_3)$—$CF_2$—, —$CF_2$—$CF(CF_3)$—, —$C(CF_3)_2$—, —$CH_2$—$CF_2$—$CF_2$—$CF_2$—, —CHF—$CF_2$—$CF_2$—$CF_2$—, —$CF_2$—$CF_2$—$CF_2$—$CF_2$—, —$CH(CF_3)$—$CF_2$—$CF_2$—, —$CF(CF_3)$—$CF_2$—$CF_2$—, and —$C(CF_3)_2$—$CF_2$—. Of these, a perfluorinated alkylene group with 1 or 2 carbon atoms is preferable, with —$CF_2$— being more preferable.

Examples of the fluorinated alkylene group of $Rf_{12}$ include —CHF—, —$CF_2$—, —$CH_2$—$CF_2$—, —CHF—$CF_2$—, —$CF_2$—$CF_2$—, —$CF(CF_3)$—, —$CH_2$—$CF_2$—$CF_2$—, —CHF—$CF_2$—$CF_2$—, —$CF_2$—$CF_2$—$CF_2$—, —$CF(CF_3)$—$CF_2$—, —$CF_2$—$CF(CF_3)$—, —$C(CF_3)_2$—, —$CH_2$—$CF_2$—$CF_2$—$CF_2$—, —CHF—$CF_2$—$CF_2$—$CF_2$—, —$CF_2$—$CF_2$—$CF_2$—$CF_2$—, —$CH(CF_3)$—$CF_2$—$CF_2$—, —$CF(CF_3)$—$CF_2$—$CF_2$—, and —$C(CF_3)_2$—$CF_2$—. Of these, a perfluorinated alkylene group with 1 to 3 carbon atoms is preferable, with —$CF_2$—, —$CF_2CF_2$—, —$CF_2$—$CF_2$—$CF_2$—, —$CF(CF_3)$—$CF_2$—, or —$CF_2$—$CF(CF_3)$— being more preferable.

The fluorinated alkyl group of $Rf_{13}$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_{13}$, a hydrogen atom may be substituted with a substituent other than a fluorine atom; however, the fluorinated alkyl group of $Rf_{13}$ preferably does not contain a substituent (for example, —CN, —$CH_2$I, or —$CH_2$Br) other than a fluorine atom.

Examples of the fluorinated alkyl group of $Rf_{13}$ include —$CH_2F$, —$CHF_2$, —$CF_3$, —$CH_2$—$CH_2F$, —$CH_2$—$CHF_2$, —$CH_2$—$CF_3$, —CHF—$CH_2F$, —CHF—$CHF_2$, —CHF—$CF_3$, —$CF_2$—$CH_2F$, —$CF_2$—$CHF_2$, —$CF_2$—$CF_3$, —$CH_2$—$CF_2$—$CH_2F$, —CHF—$CF_2$—$CH_2F$, —$CF_2$—$CF_2$—$CH_2F$, —$CF(CF_3)$—$CH_2F$, —$CH_2$—$CF_2$—$CHF_2$, —CHF—$CF_2$—$CHF_2$, —$CF_2$—$CF_2$—$CHF_2$, —$CF(CF_3)$—$CHF_2$, —$CH_2$—$CF_2$—$CF_3$, —CHF—$CF_2$—$CF_3$, —$CF_2$—$CF_2$—$CF_3$, —$CF(CF_3)$—$CF_3$, —$CH_2$—$CF_2$—$CF_2$—$CF_3$, —CHF—$CF_2$—$CF_2$—$CF_3$, —$CF_2$—$CF_2$—$CF_2$—$CF_3$, —$CH(CF_3)$—$CF_2$—$CF_3$, —$CF(CF_3)$—$CF_2$—$CF_3$, and —$C(CF_3)2$-$CF_3$. Of these, —$CF_3$, —CHF—$CF_3$, —$CF_2$—$CHF_2$, —$CF_2$—$CF_3$, —$CF_2$—$CF_2$—$CF_3$, —$CF(CF_3)$—$CF_3$, —$CF_2$—$CF_2$—$CF_2$—$CF_3$, —$CH(CF_3)$—$CF_2$—$CF_3$, or —$CF(CF_3)$—$CF_2$—$CF_3$ is preferable.

p is preferably 0.

m is preferably an integer from 0 to 2, more preferably 0 or 1, and still more preferably 0. When p is 0, m is preferably also 0.

n is preferably an integer from 0 to 2, more preferably 0 or 1, and still more preferably 0.

The repeating unit is preferably
—$CH_2$—CF[—$CF_3$]—,
—$CH_2$—CF[—$CF_2CF_3$]—,
—$CH_2$—CF[—$CF_2CF_2CF_3$]—,
—$CH_2$—CF[—$CF_2CF_2CF_2CF_3$]—,
—$CH_2$—CF[—$CF_2$—O—$CF(CF_3)$—$CF_2$—O—CHF—$CF_3$]—,
—$CH_2$—CF[—$CF_2$—O—$CF(CF_3)$—$CF_2$—O—$CF_2$—$CF_3$]—,
—$CH_2$—CF[—$CF_2$—O—$CF(CF_3)$—$CF_2$—O—CF$(CF_3)$—$CF_3$]—,
—$CH_2$—CF[—$CF_2$—O—$CF(CF_3)$—$CF_2$—O—CH$(CF_3)$—$CF_2$—$CF_3$]—,
—$CH_2$—CF[—$CF_2$—O—$CF(CF_3)$—$CF_2$—O—CF$(CF_3)$—$CF_2$—$CF_3$]—,
—$CH_2$—CF[—$OCF_2OCF_3$]—,
—$CH_2$—CF[—$OCF_2CF_2CF_22OCF_3$]—,
—$CH_2$—CF[—$CF_2OCFOCF_3$]—,
—$CH_2$—CF[—$CF_2OCF_2CF_2CF_2OCF_3$]—, or
—$CH_2$—CF[—O—$CF_2$—$CF_3$]—,
with —$CH_2$—CF[—$CF_3$]—, or
—$CH_2$—CF[—$CF_2$—O—$CF(CF_3)$—$CF_2$—O—CHF—$CF_3$]—,
being more preferable.

In the monomer constituting the fluorinated monomer unit represented by the formula (2), $Rf_2$ is a linear or branched fluorinated alkyl with 1 to 12 carbon atoms, or a linear or branched fluorinated alkoxy group with 1 to 12 carbon atoms. The fluorinated alkyl group and the fluorinated alkoxy group may each contain an oxygen atom (—O—) between carbon-carbon atoms when the number of carbon atoms is 2 or more.

The fluorinated alkyl group of $Rf_2$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_2$, a hydrogen atom may be substituted with a substituent other than a fluorine atom; however, the fluorinated alkyl group of $Rf_2$ preferably does not contain a substituent other than a fluorine atom.

Alternatively, the fluorinated alkoxy group of $Rf_2$ may be a partially fluorinated alkoxy group in which a portion of the hydrogen atoms attached to the carbon atom are substituted with fluorine atoms, or may be a perfluorinated alkoxy group in which all of the hydrogen atoms attached to the carbon atom are substituted with fluorine atoms. In the fluorinated alkoxy group of $Rf_2$, a hydrogen atom may be substituted with a substituent other than a fluorine atom; however, the fluorinated alkoxy group of $Rf_2$ preferably does not contain a substituent other than a fluorine atom.

The number of carbon atoms in $Rf_2$ is preferably 1 to 10, more preferably 1 to 6, still more preferably 1 to 4, and particularly preferably 1.

$Rf_2$ is preferably a group represented by the formula:

$$-(Rf_{21})m\text{-}(O)p\text{-}(Rf_{22}-O)n\text{-}Rf_{23}$$

wherein $Rf_{21}$ and $Rf_{22}$ are each independently a linear or branched fluorinated alkylene group with 1 to 4 carbon atoms; $Rf_{23}$ is a linear or branched fluorinated alkyl group with 1 to 4 carbon atoms; p is 0 or 1; m is an integer from 0 to 4; and n is an integer from 0 to 4.

The fluorinated alkylene group of $Rf_{21}$ and $Rf_{22}$ may be a partially fluorinated alkylene group in which a portion of the hydrogen atoms attached to the carbon atom are substituted with fluorine atoms, or may be a perfluorinated alkylene group in which all of the hydrogen atoms attached to the carbon atom are substituted with fluorine atoms. In the fluorinated alkylene group of $Rf_{21}$ and $Rf_{22}$, a hydrogen atom may be substituted with a substituent other than a fluorine atom; however, the fluorinated alkylene group of $Rf_{21}$ and $Rf_{22}$ preferably does not contain a substituent other than a fluorine atom. $Rf_{21}$ and $Rf_{22}$ may each be the same or different in each occurrence.

Examples of the fluorinated alkylene group of $Rf_{21}$ include —CHF—, —$CF_2$—, —$CH_2$—$CF_2$—, —CHF—$CF_2$—, —$CF_2$—$CF_2$—, —$CF(CF_3)$—, —$CH_2$—$CF_2$—

$-CF_2-$, $-CHF-CF_2-CF_2-$, $-CF_2-CF_2-CF_2-$, $-CF(CF_3)-CF_2-$, $-CF_2-CF(CF_3)-$, $-C(CF_3)_2-$, $-CH_2-CF_2-CF_2-CF_2-$, $-CHF-CF_2-CF_2-CF_2-$, $-CF_2-CF_2-CF_2-CF_2-$, $-CH(CF_3)-CF_2-CF_2-$, $-CF(CF_3)-CF_2-CF_2-$, and $-C(CF_3)_2-CF_2-$. Of these, a perfluorinated alkylene group with 1 or 2 carbon atoms is preferable, with $-CF_2-$ being more preferable.

Examples of the fluorinated alkylene group of $Rf_{22}$ include $-CHF-$, $-CF_2-$, $-CH_2-CF_2-$, $-CHF-CF_2-$, $-CF_2-CF_2-$, $-CF(CF_3)-$, $-CH_2-CF_2-CF_2-$, $-CHF-CF_2-CF_2-$, $-CF_2-CF_2-CF_2-$, $-CF(CF_3)-CF_2-$, $-CF_2-CF(CF_3)-$, $-C(CF_3)_2-$, $-CH_2-CF_2-CF_2-CF_2-$, $-CHF-CF_2-CF_2-CF_2-$, $-CF_2-CF_2-CF_2-CF_2-$, $-CH(CF_3)-CF_2-CF_2-$, $-CF(CF_3)-CF_2-CF_2-$, and $-C(CF_3)_2-CF_2-$. Of these, a perfluorinated alkylene group with 1 to 3 carbon atoms is preferable, with $-CF_2-$, $-CF_2CF_2-$, $-CF_2-CF_2-CF_2-$, $-CF(CF_3)-CF_2-$, or $-CF_2-CF(CF_3)-$ being more preferable.

The fluorinated alkyl group of $Rf_{23}$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_{23}$, a hydrogen atom may be substituted with a substituent other than a fluorine atom; however, the fluorinated alkyl group of $Rf_{23}$ preferably does not contain a substituent (for example, $-CN$, $-CH_2I$, or $-CH_2Br$) other than a fluorine atom.

Examples of the fluorinated alkyl group of $Rf_{23}$ include $-CH_2F$, $-CHF_2$, $-CF_3$, $-CH_2-CH_2F$, $-CH_2-CHF_2$, $-CH_2-CF_3$, $-CHF-CH_2F$, $-CHF-CHF_2$, $-CHF-CF_3$, $-CF_2-CH_2F$, $-CF_2-CHF_2$, $-CF_2-CF_3$, $-CH_2-CF_2-CH_2F$, $-CHF-CF_2-CH_2F$, $-CF_2-CF_2-CH_2F$, $-CF(CF_3)-CH_2F$, $-CH_2-CF_2-CHF_2$, $-CHF-CF_2-CHF_2$, $-CF_2-CF_2-CHF_2$, $-CF(CF_3)-CHF_2$, $-CH_2-CF_2-CF_3$, $-CHF-CF_2-CF_3$, $-CF_2-CF_2-CF_3$, $-CF(CF_3)-CF_3$, $-CH_2-CF_2-CF_2-CF_3$, $-CHF-CF_2-CF_2-CF_3$, $-CF_2-CF_2-CF_2-CF_3$, $-CH(CF_3)-CF_2-CF_3$, $-CF(CF_3)-CF_2-CF_3$, and $-C(CF_3)_2-CF_3$. Of these, $-CF_3$, $-CHF-CF_3$, $-CF_2-CHF_2$, $-CF_2-CF_3$, $-CF_2-CF_2-CF_3$, $-CF(CF_3)-CF_3$, $-CF_2-CF_2-CF_2-CF_3$, $-CH(CF_3)-CF_2-CF_3$, or $-CF(CF_3)-CF_2-CF_3$ is preferable.

p is preferably 0.

m is preferably an integer from 0 to 2, more preferably 0 or 1, and still more preferably 0. When p is 0, m is preferably also 0.

n is preferably an integer from 0 to 2, more preferably 0 or 1, and still more preferably 0.

The repeating unit is preferably
$-CHF-CH[-CF_3]-$,
$-CHF-CH[-CF_2CF_3]-$,
$-CHF-CH[-CF_2CF_2CF_3]-$, or
$-CHF-CH[-CF_2CF_2CF_2CF_3]-$,
with $-CHF-CH[-CF_3]-$
being more preferable.

The molar ratio of the vinylidene fluoride unit/the copolymerization unit (A) of the polymer is preferably 87/13 to 20/80. The polymer having such a molar ratio is preferable in the point of satisfactorily exhibiting the function as a binder while suitably suppressing gelation.

The polymer of the present disclosure is preferably a fluoroelastomer. The fluoroelastomer is a fluorine-containing polymer that is amorphous and has a low glass transition temperature. The polymer may contain a repeating unit derived from the monomer that provides crosslinking sites; however, in one embodiment of the present disclosure, the polymer does not contain a cross-linking agent.

Preferably, the polymer according to the present disclosure has a glass transition temperature of 25° C. or less. More preferably, the glass transition temperature is 0° C. or less. The glass transition temperature is still more preferably −5° C. or less, and most preferably −10° C. or less. The glass transition temperature may even be −20° C. or less. As used herein, the glass transition temperature is determined as follows: using a differential scanning calorimeter (X-DSC823e; Hitachi Technoscience Corporation), a DSC curve is obtained by cooling to −75° C., and then heating 10 mg of a sample at 20° C./min, and the temperature at the intersection of the extended baseline around the second transition of the DSC curve, and the tangent at the inflection point of the DSC curve was determined as the glass transition temperature.

The polymer according to the present disclosure is preferably amorphous. Amorphous means that there is no melting point peak in the DSC curve described above.

The fluoroelastomer that is amorphous and has such a low Tg, which dissolves easily in a solvent, is particularly preferable in terms of giving flexibility and ease of processing to the electrode, when used as a binder.

The polymer according to the present disclosure suitably comprises two components of the vinylidene fluoride unit and the copolymerization unit (A), but optionally comprises a further monomer unit copolymerizable with the vinylidene fluoride unit and the copolymerization unit (A) when a binder is desired to have lower-temperature performance. In this case, the content of the further monomer unit is preferably 50 mol % or less of total monomer units. The content of the further monomer unit is more preferably 30 mol % or less, and still more preferably 15 mol % or less.

In the case of above, particularly, the polymer is preferably the fluorine-containing copolymer containing the vinylidene fluoride, the fluorinated monomer unit represented by the formula (1) above, and the further monomer unit. Preferably, the molar ratio of the vinylidene fluoride unit/the fluorinated monomer unit is 87/13 to 20/80, and the further monomer unit constitutes 0 to 50 mol % of total monomer units.

The further monomer is preferably at least one selected from the group consisting of tetrafluoroethylene (TFE), hexafluoropropylene (HFP), perfluoro(methylvinylether), perfluoro(ethylvinylether), perfluoro(propylvinylether), chlorotrifluoroethylene, trifluoroethylene, hexafluoroisobutene, vinyl fluoride, ethylene, propylene, alkyl vinyl ether, and a monomer that provides reactive functional groups, with TFE and a monomer that provides reactive functional groups being still more preferable. The further monomer constituted only by TFE or a monomer that provides reactive functional groups respectively is also one of preferable embodiments.

The polymer may also use the monomer that provides reactive functional groups as the further monomer.

The monomer that provides reactive functional groups is not limited; for example, an iodine- or bromine-containing monomer represented by the formula:

wherein $X^1$ is a hydrogen atom, a fluorine atom, or $-CH_3$; $Rf^1$ is a fluoroalkylene group, a perfluoroalkylene group, a fluoro(poly)oxyalkylene group, or a perfluoro(poly)oxyalkylene group; $R^1$ is a hydrogen atom or $-CH_3$; and $X^2$ is an iodine atom or a bromine atom;

a monomer represented by the formula:

wherein m is an integer from 0 to 5; n is an integer from 1 to 3; and $X^3$ is a cyano group, a carboxyl group, an alkoxycarbonyl group, an iodine atom, or a bromine atom; or a monomer represented by the formula:

wherein m is an integer from 0 to 5; n is an integer from 1 to 3; and $X^4$ is a cyano group, a carboxyl group, an alkoxycarbonyl group, an iodine atom, a bromine atom, or $-CH_2OH$ may be used as the further monomer.

Of these, at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF_2CH_2I$, $CF_2=CFOCF_2CF(CF_3)OCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, and $CH_2=CFCF_2OCF(CF_3)CF_2OCF(CF_3)CH_2OH$ is preferable.

The polymer preferably has an end structure that satisfies the following inequality:

$$0.01 \leq ([-CH_2OH]+[-COOH])/([-CH_3]+[-CF_2H]+[-CH_2OH]+[-CH_2I]+[-OC(O)RH]+[-COOH]) \leq 0.25$$

wherein R represents an alkyl group with 1 to 20 carbon atoms.

When the end functional groups satisfy the formula described above, an excellent function as a binder in terms of satisfactory adhesion and flexibility is achieved.

Since $[-CH_2OH]$ and $[-COOH]$ have a functional group having high affinity such as a hydroxyl group and a carboxyl group, the polymer has a compatibility with the oxide-based solid electrolyte particles and the active material. Therefore, it is preferable that the polymer contains these functional groups in a certain proportion or higher so as to serve as a binder with excellent adhesion. In contrast, if the amount of $[-CH_2OH]$ and $[-COOH]$ is excessively large, the flexibility of the polymer decreases. From this viewpoint, the amount of $[-CH_2OH]$ and $[-COOH]$ is preferred to fall in the above-described range.

Satisfying the formula above does not mean that all of the functional groups $[-CH_3]$, $[-CF_2H]$, $[-CH_2OH]$, $[-CH_2I]$, $[-OC(O)RH]$, and $[-COOH]$ are included in the ends of the polymer, but means that the ratio of the numbers of the present end groups among them falls in the above-described range.

The amount of each end group present in the resin can be determined by NMR analysis.

Analysis of the end groups by NMR is conducted by measurement using the proton solution NMR method. An analytical sample is prepared as a 20 wt % solution in acetone-d6 as a solvent, and the measurement is conducted.

The reference peak is the peak top of acetone at 2.05 ppm.

Measurement apparatus: VNMRS400; Varian Inc.

Resonance frequency: 399.74 (Sfrq)

Pulse width: 45°

Each end group is associated with each of the following peak positions:

$[-CH_3]$: 1.72-1.86 ppm
$[-CF_2H]$: 6.1-6.8 ppm
$[-CH_2OH]$: 3.74-3.80 ppm
$[-CH_2I]$: 3.87-3.92 ppm
$[-OC(O)RH]$: 1.09-1.16 ppm
$[-COOH]$: 10-15 ppm The amount of each of the functional groups is calculated from the peak intensity based on the integrated value of the peak identified by the measurement described above, and the ratio of the numbers of the functional groups is calculated based on the results, using the following formula:

$$([-CH_2OH]+[-COOH])/([-CH_3]+[-CF_2H]+[-CH_2OH]+[-CH_2I]+[-OC(O)RH]+[-COOH])$$

The method for controlling the amount of $[-CH_2OH]$ and $[-COOH]$ in the predetermined range described above is not limited, and known methods (for example, the selection and the amount of the initiator to be used) may be used.

To achieve satisfactory adhesion and flexibility, as well as satisfactory solubility in a solvent, the polymer according to the present disclosure preferably has a number average molecular weight (Mn) of 7,000 to 5,000,000, preferably has a mass average molecular weight (Mw) of 10,000 to 10,000,000, and preferably has an Mw/Mn of 1.0 to 30.0, and more preferably has an Mw/Mn of 1.5 to 25.0. The number average molecular weight (Mn), the mass average molecular weight (Mw), and the Mw/Mn are the values measured using the gel permeation chromatography (GPC) method. These can be measured by using N,N-dimethyl formamide as a solvent at 50° C. The columns used in the measurement are AS-8010, CO-8020, columns (three GMHHR-H columns connected in series); Tosoh Corporation, and RID-10A; Shimadzu Corporation. These were calculated from data (reference: polystyrene) measured when the solvent was flowed in a flow rate of 1.0 ml/min.

The polymer according to the present disclosure has a Mooney viscosity (ML1+10 (121° C.)) at 121° C. of preferably 2 or more, more preferably 5 or more, still more preferably 10 or more, and particularly preferably 30 or more. The polymer according to the present disclosure has a Mooney viscosity (ML1+10 (140° C.)) at 140° C. of preferably 2 or more, more preferably 5 or more, still more preferably 10 or more, and particularly preferably 30 or more. The Mooney viscosity is the value measured in accordance with ASTM-D1646-15 and JIS K6300-1:2013.

The polymer of the present disclosure may be produced using a common radical polymerization method. While the form of polymerization may be any of block polymerization, solution polymerization, suspension polymerization, and emulsion polymerization, emulsion polymerization is preferable in that it is easily implemented on an industrial scale.

In the polymerization, a polymerization initiator, a surfactant, a chain transfer agent, and a solvent may be used, and these components may each be a conventionally known one. In the polymerization of the copolymer, an oil-soluble radical polymerization initiator or a water-soluble radical initiator may be used as the polymerization initiator.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; dialkyl peroxides such as di-t-butyl peroxide; and di[perfluoro (or fluorochloro)acyl] peroxides such as di(ω-hydro-dodecafluoroheptanoyl) peroxide, di(ω-hydro-tetradecafluoroheptanoyl) peroxide, di(ω-hydrohexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chlorohexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl peroxide, ω-chloro-hexafluorobutyryl-ω-chloro-decafluorohexanoyl peroxide, ω-hydro-dodecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples include ammonium salts, potassium salts, sodium salts, t-butyl permaleates, and t-butyl hydroperoxides of persulfuric acid, perboric acid, perchloric acid, perphosphoric acid, and percarbonic acid. A reducing agent such as a sulfite or a sulfurous acid salt may be used in combination with such a peroxide, and the reducing agent may be used in an amount of 0.1 to 20 times the amount of the peroxide.

While the amount of the radical polymerization initiator to be added is not limited, the radical polymerization initiator may be added all at once at the beginning of the polymerization, sequentially, or continuously in at least an amount that does not significantly reduce the polymerization rate (for example, several ppm based on the water concentration). The upper limit is in the range where the heat of polymerization reaction can be removed from the surface of the apparatus.

The surfactant may be a nonionic surfactant, an anionic surfactant, a cationic surfactant, or the like, and is preferably a linear or branched fluorine-containing anionic surfactant with 4 to 20 carbon atoms, such as ammonium perfluorooctanoate or ammonium perfluorohexanoate. The amount of the surfactant to be added (based on water for polymerization) is preferably 10 to 5,000 ppm, and more preferably 50 to 5,000 ppm. Alternatively, the surfactant may be a reactive emulsifier. While the reactive emulsifier is not limited as long as it is a compound with one or more unsaturated bonds and one or more hydrophilic groups, examples include $CH_2=CFCF_2OCF(CF_3)CF_2OCF(CF_3)COONH_4$, $CH_2=CFCF_2CF(CF_3)OCF_2CF_2COONH_4$, and $CF_2=CFOCF_2CF(CF_3)OCF(CF_3)COONH_4$. The amount of the reactive emulsifier to be added (based on polymerization water) is preferably 10 to 5,000 ppm, and more preferably 50 to 5,000 ppm.

In the polymerization, examples of the chain transfer agent include esters such as dimethyl malonate, diethyl malonate, methyl acetate, ethyl acetate, butyl acetate, and dimethyl succinate, as well as isopentane, methane, ethane, propane, isopropanol, acetone, various mercaptans, carbon tetrachloride, and cyclohexane.

Alternatively, the chain transfer agent may be a bromine compound or an iodine compound. Examples of polymerization methods using a bromine compound or an iodine compound include a method in which emulsion polymerization is conducted in the water medium while applying pressure, in the presence of the bromine compound or iodine compound, substantially under oxygen-free conditions (iodine transfer polymerization method). Representative examples of the bromine compound or iodine compound to be used include a compound represented by the formula:

$R^2I_xBr_y$ wherein x and y are each an integer from 0 to 2, and satisfy $1 \leq x+y \leq 2$; and $R^2$ is a saturated or unsaturated fluorohydrocarbon or chlorofluorohydrocarbon group with 1 to 16 carbon atoms, or a hydrocarbon group with 1 to 3 carbon atoms, which optionally contains an oxygen atom.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo iodoperfluorobutane, 3-bromo-4-iodoperfluorobutene-1, 2-bromo-4-iodoperfluorobutene-1, a monoiodomonobromo-substituted benzene, a diiodomonobromo-substituted benzene, as well as (2-iodoethyl)- and (2-bromoethyl)-substituted benzenes. These compounds may be used alone or in combination with each other.

Of these, 1,4-diiodoperfluorobutane, 1,6-diiodoperfluorohexane, and 2-iodoperfluoropropane are preferably used, because of their polymerization reactivity, crosslinking reactivity, and ease of availability.

The solvent is preferably a solvent without chain transfer property. For solution polymerization, the solvent may be dichloropentafluoropropene (R-225), for example, and for emulsion polymerization and suspension polymerization, the solvent may be water, a mixture of water and a water-soluble organic solvent, or a mixture of water and a water-insoluble organic solvent.

In the case where emulsion polymerization is employed for the polymer obtained using the method described above, the polymer as a powder can be obtained by coagulating the dispersion soon after polymerization, washing the resulting product with water, dehydrating, and drying. The coagulation can be accomplished by adding an inorganic acid or an inorganic salt such as aluminum sulfate, by applying mechanical shear force, or by freezing the dispersion. In the case where suspension polymerization is employed, the polymer as a powder can be obtained by collecting it from the dispersion soon after polymerization, and drying. In the case where solution polymerization is employed, the polymer as a powder can be obtained by drying the polymer-containing solution as is, or by purifying the polymer by dropwise addition of a poor solvent.

The polymer may be a single polymer, or two or more polymers. In particular, the polymer may be a combination of two copolymers with different molecular structures.

The binder of the present disclosure may be a binder that further contains other fluorine-containing polymer within the range of not affecting the effect of the present disclosure.

While the other fluorine-containing polymer is not limited, examples include polyvinylidene fluoride. The polyvinylidene fluoride may be a homopolymer or a copolymer. The other fluorine-containing polymer may also be, for example, a vinylidene fluoride (VdF)-based fluoroelastomer. While the comonomer in the VdF-based fluoroelastomer is not limited as long as it is copolymerizable with VdF, examples include tetrafluoroethylene (TFE), hexafluoropropylene (HEP), perfluoroalkyl vinyl ether (PAVE), chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, and iodine-containing fluorinated vinyl ether, among which one or more may be used in combination. Specific examples include a VdF/HFP copolymer, and a VdF/TFE/HFP copolymer.

When the other fluorine-containing polymers are used in combination, the other fluorine-containing polymers are preferably used in a proportion of 10 to 90 mass % based on the mass of the fluorine-containing polymer.

The present disclosure also provides a slurry comprising the binder and the oxide-based solid electrolyte. The slurry is a slurry in which oxide-based solid electrolyte particles are dispersed in liquid medium. Preferably, the binder is dissolved or dispersed in liquid medium.

Preferably, the oxide-based solid electrolyte is a compound that contains an oxygen atom (O), has the ion conductivity of metals belonging to the Group 1 or 2 of the periodic table, and has electron-insulating property.

Specific examples of the compound include $Li_{xa}La_{ya}TiO_3$ [xa=0.3 to 0.7, ya=0.3 to 0.7] (LLT), $Li_{xb}La_{yb}Zr_{zb}M^{bb}{}_{mb}O_{nb}$ ($M^{bb}$ is at least one or more elements of Al, Mg, Ca, Sr, V, Nb, Ta, Ti, Ge, In, and Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$), $Li_{xc}B_{yc}M^{cc}{}_{zc}O_{nc}$ ($M^{cc}$ is at least one or more elements of C, S, Al, Si, Ga, Ge, In, and Sn, xc satisfies $0 \leq xc \leq 5$, yc satisfies $0 \leq yc \leq 1$, zc satisfies $0 \leq zc \leq 1$, and nc satisfies $0 \leq nc \leq 6$), $Li_{xd}(Al,Ga)_{yd}(Ti,Ge)_{zd}Si_{ad}P_{md}O_{nd}$ (provided that $1 \leq xd \leq 3$, $0 \leq yd \leq 2$, $0 \leq zd \leq 2$, $0 \leq ad \leq 2$, $1 \leq md \leq 7$, $3 \leq nd \leq 15$), $Li_{(3-2xe)}M^{ee}{}_{xe}D^{ee}O$ (xe represents a number of 0 or more and 0.1 or less, and $M^{ee}$ represents a bivalent metal atom. $D^{ee}$ represents a halogen atom or in combination of two or more halogen atoms), $Li_{xf}Si_{yf}O_{zf}$ ($1 \leq xf \leq 5$, $0 < yf \leq 3$, $1 \leq zf \leq 10$), $Li_{xg}S_{yg}O_{zg}$ ($1 \leq xg \leq 3$, $0 < yg \leq 2$, $1 \leq zg \leq 10$) $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w is w<1), $Li_{3.5}Zn_{0.25}GeO_4$ having LISICON (Lithium super ionic conductor)-type crystal structure, $La_{0.51}Li_{0.34}TiO_{2.94}$ having perovskite-type crystal structure, $La_{0.55}Li_{0.35}TiO_3$, $LiTi_2P_3O_{12}$ having NASICON (Natrium super ionic conductor)-type crystal structure, $Li_{1+xh+yh}(Al, Ga)_{xh}(Ti, Ge)_{2-xh}Si_{yh}P_{3-yh}O_{12}$ (provided that $0 \leq xh \leq 1$, $0 \leq yh \leq 1$), and $Li_7La_3Zr_2O_{12}$ (LLZ) having garnet-type crystal structure. Further, a ceramic material in which an element in LLZ is substituted is also known. Examples include an LLZ-based ceramic material in which at least one element of Mg (magnesium) and A (A is at least one element selected from the group consisting of Ca (calcium), Sr (strontium), and Ba (barium)) in LLZ is substituted. A phosphorus compound containing Li, P, and O is also desirable. Examples include lithium phosphate ($Li_3PO_4$), LiPON in which a part of the oxygen in lithium phosphate is substituted with nitrogen, and $LiPOD^1$ ($D^1$ is at least one selected from Ti, V, Cr, Mn, Fe, Co, Ni, Cu, Zr, Nb, Mo, Ru, Ag, Ta, W, Pt, and Au). $LiA^1ON$ ($A^1$ is at least one selected from Si, B, Ge, Al, C, and Ga) and the like is also used preferably.

Specific examples include $Li_2O$—$Al_2O_3$—$SiO_2$—$P_2O_5$—$TiO_2$—$GeO_2$, and $Li_2O$—$Al_2O_3$—$SiO_2$—$P_2O_5$—$TiO_2$.

Preferably, the oxide-based solid electrolyte contains lithium. The lithium-containing oxide-based solid electrolyte is used in solid-state batteries that use lithium ions as a carrier and is especially preferable in the point of being an electrochemical device having a high energy density.

Preferably, the oxide-based solid electrolyte is an oxide having a crystal structure. The oxide having a crystal structure is especially preferable in the point of having satisfactory Li-ion conductivity.

Examples of the oxide having a crystal structure include perovskite type ($La_{0.51}Li_{0.34}TiO_{2.94}$ and the like), NASICON type ($Li_{1.3}Al_{0.3}Ti_{1.7}(PO_4)_3$ and the like), and garnet type ($Li_7La_3Zr_2O_{12}$ (LLZ) and the like). Of these, garnet type is preferable.

While the volume average particle size of an oxide-based solid electrolyte is not limited, it is preferably 0.01 μm or more, and more preferably 0.03 μm or more. The upper limit is preferably 100 μm or less, and more preferably 50 μm or less. The volume average particle size of oxide-based solid electrolyte particles is measured by the following procedures. Using water (heptane when unstable in water), oxide-based solid electrolyte particles are diluted in a 20 ml sample bottle to prepare a 1 mass % dispersion. The diluted dispersed sample is irradiated with 1 kHz ultrasonic for 10 minutes and immediately used for the test. Using a laser diffraction/scattering particle size distribution analyzer LA-920 (HORIBA, Ltd.), data of the dispersion sample in a quartz cell for measurement is captured 50 times at a temperature of 25° C. to obtain a volume average particle size. For other detail conditions and the like, the description in JISZ8828:2013 "Particle size analysis—dynamic light scattering" is optionally referenced. Five samples are prepared per volume average particle size level, and the average thereof is employed.

The content of an oxide-based solid electrolyte in the solid component in a solid electrolyte composition is preferably 3 mass % or more, more preferably 4 mass % or more, particularly preferably 5 mass % or more in 100 mass % of the solid component, at an electrode, considering the reduction of interfacial resistance and the retention of the reduced interfacial resistance when used in an all-solid-state secondary battery. The upper limit is, from the same viewpoint, preferably 99 mass % or less, more preferably 90 mass % or less, and particularly preferably 80 mass % or less.

In the oxide-based solid electrolyte layer interposed between the positive electrode and the negative electrode, it is preferably 50 mass % or more, more preferably 60 mass % or more, and particularly preferably 70 mass % or more. The upper limit is, from the same viewpoint, preferably 99.9 mass % or less, more preferably 99.8 mass % or less, and particularly preferably 99.7 mass % or less. The oxide-based solid electrolyte may be used alone, or 2 or more of them may be used in combination. In the present description, the solid content (solid component) refers to the component that does not disappear as volatilizes or evaporates when drying process is conducted at 170° C. for 6 hours under nitrogen atmosphere. Typically, the solid content refers to components other than a dispersion medium to be described later.

Examples of the dispersion medium used to prepare the slurry of the present disclosure include, other than nitrogen-containing organic solvents such as N-methylpyrrolidone, dimethylformamide, and dimethylacetamide, ketone solvents such as acetone, methyl ethyl ketone, cyclohexanone, and methyl isobutyl ketone; ester solvents such as ethyl acetate, and butyl acetate; ether solvents such as tetrahydrofuran, and dioxane; and further common organic solvents of a low-boiling point such as mixed solvents of these. Of these, N-methylpyrrolidone is preferable in the point of excellent stability and applicability of a slurry.

The slurry of the present disclosure preferably has a low water content, which is specifically 200 ppm or less, more preferably 100 ppm or less, and still more preferably 50 ppm or less.

The slurry of the present disclosure may be used as a slurry for a positive electrode or a slurry for a negative electrode. The slurry of the present disclosure may also be used as a slurry for forming a solid electrolyte layer. When the slurry of the present disclosure is used as a slurry for an electrode, it further contains an active material. The active material may be a positive electrode active material or a negative electrode active material. The slurry of the present disclosure is more suitable for use as a slurry for a positive electrode that contains a positive electrode active material.

In the slurry of the present disclosure, the amount of an active material to be blended is preferably 1 to 99.0 mass % based on the total solid content of the slurry. The lower limit is more preferably 10 mass %, and still more preferably 20 mass %. The upper limit is more preferably 98 mass %, and still more preferably 97 mass %. When blended in the above proportion, the active material is contained in the proportion described above in the active material layer to be obtained.

The positive electrode active material is not limited as long as it is a material that can electrochemically occlude and release lithium ions. Specifically, a material containing lithium and at least one transition metal is preferable, and examples include a lithium transition metal composite oxide, and a lithium-containing transition metal phosphate compound.

The transition metal in lithium transition metal composite oxide is preferably V, Ti, Cr, Mn, Fe, Co, Ni, Cu, and the like, and specific examples of the lithium transition metal composite oxide include lithium·cobalt composite oxides such as $LiCoO_2$, lithium·nickel composite oxides such as $LiNiO_2$, lithium·manganese composite oxides such as $LiMnO_2$, $LiMn_2O_4$, and $Li_2MnO_3$, and lithium transition metal composite oxides in which a part of the transition metal atoms to be the main constituent of these lithium transition metal composite oxides is substituted with other metals such as Al, Ti, V, Cr, Mn, Fe, Co, Li, Ni, Cu, Zn, Mg, Ga, Zr, Si, and the like. Specific examples of the substituted lithium transition metal composite oxides include $LiNi_{0.5}Mn_{0.5}O_2$, $LiNi_{0.6}Mn_{0.2}Co_{0.2}O_2$, $LiNi_{0.8}Mn_{0.1}Co_{0.1}O_2$, $LiNi_{0.85}Co_{0.10}Al_{0.05}O_2$, $LiNi_{0.82}Co_{0.15}Al_{0.03}O_2$, $LiNi_{0.80}Co_{0.15}Al_{0.05}O_2$, $LiNi_{1/3}Co_{1/3}Mn_{1/3}O_2$, $LiMn_{1.8}Al_{0.2}O_4$, $LiMn_{1.5}Ni_{0.5}O_4$, and $Li_4Ti_5O_{12}$. In the positive electrode active material containing Ni, the larger a Ni proportion is, the higher a capacity of the positive electrode active material is, whereby the further improvement in a battery capacity can be expected.

The transition metal in lithium-containing transition metal phosphate compound is preferably V, Ti, Cr, Mn, Fe, Co, Ni, Cu, and the like, and specific examples of the lithium-containing transition metal phosphate compound include iron phosphates such as $LiFePO_4$, $Li_3Fe_2(PO_4)_3$, and $LiFeP_2O_7$, cobalt phosphates such as $LiCoPO_4$, and lithium-containing transition metal phosphate compounds in which a part of the transition metal atoms to be the main constituent of these lithium-containing transition metal phosphate compounds is substituted with other metals such as Al, Ti, V, Cr, Mn, Fe, Co, Li, Ni, Cu, Zn, Mg, Ga, Zr, Nb, Si, and the like.

From the viewpoint of high voltage, high energy density, or charge and discharge cycle characteristics, $LiCoO_2$, $LiNiO_2$, $LiMn_2O_4$, $LiNi_{0.8}Mn_{0.1}Co_{0.1}O_2$, $LiNi_{0.6}Mn_{0.2}Co_{0.2}O_2$, $LiNi_{0.82}Co_{0.15}Al_{0.03}O_2$, $LiNi_{0.80}Co_{0.15}Al_{0.05}O_2$, $LiNi_{1/3}Co_{1/3}Mn_{1/3}O_2$, and $LiFePO_4$ are particularly preferable.

The shape of the positive electrode active material is particulate, and the conventionally used shapes such as block, polyhedron, sphere, oval, plate, needle, and column may be used. Of these, the active material is preferably composed of secondary particles in each of which primary particles aggregate and has the secondary particle in the shape of sphere or oval. Typically, the active material in an electrode expands and contracts as an electrochemical element is charged and discharged, and therefore degradation such as the active material breakage and the conductive path disruption are prone to occur due to the stress. For this reason, the active material composed of secondary particles in each of which primary particles aggregate, rather than the single-particle active material composed only of primary particles, is preferable because it mitigates the stress from the expansion and contraction and prevents the degradation. Further, spherical or oval shape particles, rather than particles that are axially oriented such as a plate shape, are preferable because such particles are less oriented when molding an electrode with little expansion and contraction of the electrode during charging and discharging and are also likely to be mixed homogeneously when mixed with a conductive aid when an electrode is prepared.

Alternatively, a positive electrode active material to the surface of which a substance of different composition from the substance to be the main constituent of the positive electrode active material is adhered may also be used. Examples of the surface-adhering substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate.

These surface-attached substances may be adhered to the positive electrode active material surface by, for example, a method in which a surface-attached substance is dissolved or suspended in a solvent, added to a positive electrode active material by impregnation, and dried, a method in which a surface-attached substance precursor is dissolved or suspended in a solvent, added to a positive electrode active material by impregnation, and then reacted by heating and the like, or a method in which a surface-attached substance is added to a positive electrode active material precursor and simultaneously sintered.

The surface-attached substance is used in an amount of preferably 0.1 ppm, more preferably 1 ppm, and still more preferably 10 ppm as the lower limit, whereas in an amount of preferably 20%, more preferably 10%, and still more preferably 5% as the upper limit, in terms of mass, based on the positive electrode active material. The surface-attached substance can suppress the oxidation reaction of a nonaqueous electrolytic solution at the positive electrode active material surface and improve battery life, however an adhered amount that is excessively small fails to exhibit the effects sufficiently, whereas an adhered amount that is excessively large blocks lithium ions from passing through and thus may increase the resistance.

The tap density of a positive electrode active material is typically 1.3 g/cm$^3$ or more, preferably 1.5 g/cm$^3$ or more, still more preferably 1.6 g/cm$^3$ or more, and most preferably 1.7 g/cm$^3$ or more. When a tap density of a positive electrode active material is below the lower limit, an amount of a dispersion medium required may increase, and amounts of a conductive aid and a binder required may also increase, a filling factor of the positive electrode active material into a positive electrode active material layer may be restricted, and a battery capacity may be restricted, during the formation of the positive electrode active material layer. Use of a metal composite oxide powder having a high tap density can form a high-density positive electrode active material layer. Generally, the higher a tap density is, the better, and thus there is no upper limit, but the tap density is typically 5 g/cm$^3$ or less, and preferably 2.4 g/cm$^3$ or less, because when a tap density is excessively high, lithium ion diffusion with a nonaqueous electrolytic solution as a medium is controlled in the positive electrode active material layer, thereby likely reducing load characteristics.

A tap density of a positive electrode active material is defined by passing the material through a sieve having an opening size of 300 μm, dropping the sample into a 20 cm$^3$-tapping cell to fill the cell volume, then tapping 1,000 times with a stroke length of 10 mm using a powder density meter (for example, tap denser; Seishin Enterprise Co., Ltd.), and determining a density based on the volume and the sample mass at that time as the tap density.

The median diameter d50 of positive electrode active material particles (secondary particle size when primary particles aggregate and form secondary particles) is typically 0.1 μm or more, preferably 0.5 μm or more, more preferably 1 μm or more, and most preferably 3 μm or more, and typically 20 μm or less, preferably 18 μm or less, more preferably 16 μm or less, and most preferably 15 μm or less. When a median diameter is below the lower limit, a high bulk density product may not be obtained, whereas when such a median diameter is more than the upper limit, lithium diffusion in particles takes time deteriorating battery performance, and during preparation of a positive electrode of a battery, that is, when a slurry prepared using a positive electrode active material and a conductive aid or a binder with a solvent is applied into a thin film, problems may arise such as drawing lines. When two or more positive electrode active materials having different median diameters d50 are mixed, filling properties during the positive electrode preparation may also be further improved.

The median diameter d50 in the present disclosure is measured using a known laser diffraction/scattering particle size distribution analyzer. When LA-920; HORIBA is used as the particle size distribution analyzer, the measurement is conducted using an aqueous solution of 0.1 mass % sodium hexametaphosphate as a dispersion medium to be used during measurement and setting a measurement refractive index to 1.24 after 5-minute ultrasonic dispersion.

When primary particles aggregate and form secondary particles, the average primary particle size of a positive electrode active material is typically 0.01 μm or more, preferably 0.05 μm or more, still more preferably 0.08 μm or more, and most preferably 0.1 μm or more, and is typically 3 μm or less, preferably 2 μm or less, still more preferably 1 μm or less, and most preferably 0.6 μm or less. An average primary particle size more than the above upper limit may make it difficult to form spherical shape secondary particles, adversely affect powder filling properties, significantly decrease a specific surface area, thereby likely increasing the probability of deteriorating battery performance such as output characteristic. Conversely, an average primary particle size below the lower limit may typically pose problems such as poor reversibility of charging and discharging due to underdeveloped crystal. The primary particle size is measured by observation using a scanning electron microscopy (SEM). Specifically, the primary particle size is determined, using a photo of 10,000 magnifications, by determining the longest value of the intercepts by the left and right boundary lines of primary particles for a straight line in a horizontal direction for optional 50 primary particles, and taking the average value thereof.

The BET specific surface area of a positive electrode active material is typically 0.2 m$^2$/g or more, preferably 0.3 m$^2$/g or more, and still more preferably 0.4 m$^2$/g or more, and typically 4.0 m$^2$/g or less, preferably 2.5 m$^2$/g or less, and still more preferably 1.5 m$^2$/g or less. A BET specific surface area smaller than this range may likely deteriorate battery performance, whereas a BET specific surface area larger than this range may less likely increases a tap density and a problem of applicability may arise during the positive electrode active material formation.

The BET specific surface area is defined as the value measured by the single-point method of BET adsorbed with nitrogen by the gas flow method using a nitrogen-helium mixture gas precisely adjusted so that the value of the relative pressure of nitrogen to atmospheric pressure is 0.3 after pre-drying the sample at 150 degrees C. for 30 minutes under a flow of nitrogen using a surface area meter (For example, a fully automatic BET specific surface area measuring device; Okura Riken Co.).

The method for producing a positive electrode active material used is a common method as the method for producing an inorganic compound. There are various methods conceivable for preparing a spherical or oval shape active material, and examples include a method in which a transition metal source material such as transition metal nitrate, and sulfate, and optionally other element source materials are dissolved or dispersed by grinding in a solvent such as water to prepare and collect spherical shape precursors by adjusting pH while stirring, the precursors are optionally dried and then sintered at a high temperature by adding a Li source such as LiOH, Li$_2$CO$_3$, and LiNO$_3$ thereby to obtain an active material, a method in which a transition metal source material such as transition metal nitrate, sulfate, hydroxide, and oxide, and optionally other element source materials are dissolved or dispersed by grinding in a solvent such as water to form spherical or oval shape precursors by dry-molding using a spray dryer or the like, and the precursors are sintered at a high temperature by adding a Li source such as LiOH, Li$_2$CO$_3$, and LiNO$_3$ thereby to obtain an active material, and a method in which a transition metal source material such as transition metal nitrate, sulfate, hydroxide, and oxide, a Li source such as LiOH, Li$_2$CO$_3$, and LiNO$_3$, and optionally other element source materials are dissolved or dispersed by grinding in a solvent such as water to form spherical or oval shape precursors by dry-molding using a spray dryer or the like, and the precursors are sintered at a high temperature thereby to obtain an active material.

The positive electrode active material may be used alone, or two or more active materials having different compositions or different powder properties may be used in optional combinations and ratios.

While the negative electrode active material is not limited as long as it is a material that can electrochemically occlude and release lithium ions, examples include carbonaceous materials, metal oxides such as stannous oxide, and silicon dioxide, metal composite oxides, lithium alone, and lithium alloys such as lithium-aluminum alloy, and metals capable of forming an alloy with lithium such as Sn and Si. These may be used alone, or two or more active materials may be used in optional combinations and ratios. Of these, carbonaceous materials or lithium composite oxides are preferably used in the point of safety.

While the metal composite oxide is not limited as long as it can occlude and release lithium, it is preferable to contain titanium and/or lithium as a structural unit in the viewpoint of high current density charge-discharge properties.

The carbonaceous material selected from below has satisfactory balance between initial irreversible capacity and high current density charge-discharge properties and is thus preferable;

(1) natural graphite,
(2) an artificial carbonaceous substance and an artificial graphite substance; carbonaceous materials obtained by heat treating once or more in a range from 400 to 320° C. a carbonaceous substance {for example, natural graphite, coal cokes, petroleum cokes, coal pitches, petroleum pitches, or oxidized products of these pitches, needle cokes, pitch cokes, and carbonaceous materials a part of which is graphitized, pyrolysates of an organic matter such as furnace black, acetylene black, and pitch-based carbon fibers, carbonizable organic matters (for example, coal-tar pitches from soft pitches to hard pitches, or coal-heavy oils such as distillate liquefied oil, direct heavy oils such as atmospheric residue, and vacuum residue, cracked petroleum heavy oils such as ethylene tar by-produced during pyrolysis of crude oil, naphtha and the like, further aromatic hydrocarbons such as acenaphthylene, decacyclene, anthracene, and phenanthrene, N-ring compounds such as phenazine, and acridine, S-ring compounds such as thiophene, and bithiophene, polyphenylene such as biphenyl, and terphenyl, polyvinyl chloride, polyvinyl alcohol, polyvinyl butyral, insolubilized products of these, organic polymers such as nitrogen-containing polyacrylonitrile, and polypyrrole, organic polymers such as sulfur-containing polythiophene, and polystyrene, natural polymers such as polysaccharides represented by cellulose, lignin, mannan, polygalacturonic acid, chitosan, and saccharose, thermoplastic resins such as polyphenylene sulfide, and polyphenylene oxide, thermosetting resins such as furfuryl alcohol resin, phenol-formaldehyde resin, and imide resin) and a carbide of these, or a solution in which a carbonizable organic matter is dissolved in a low-molecule organic solvent such as benzene, toluene, xylene, quinoline, or n-hexane, and a carbide of these},
(3) a carbonaceous material in which a negative electrode active material layer comprises at least two or more carbonaceous matters having different crystallinities and/or has an interface contacting the carbonaceous matters of different crystallinities,
(4) a carbonaceous material in which a negative electrode active material layer comprises at least two or more carbonaceous matters having different orientations and/or has an interface contacting the carbonaceous matters of different orientations.

The negative electrode active material usable may also be, in addition to graphite, activated carbon, and powder carbonaceous materials obtained by firing and carbonizing a phenol resin, a pitch and the like, GeO, $GeO_2$, SnO, $SnO_2$, PbO, $PbO_2$ and the like based on a metal oxide, or a composite metal oxide of these (for example, those disclosed in Japanese Patent Laid-Open No. 7-249409).

A conductive aid is optionally added for the purpose of improving the conductivity when an active material with low electron conductivity such as $LiCoO_2$ is used in a battery and, for example, carbon blacks such as acetylene black and ketjen black, carbonaceous substances such as graphite fine powders or carbon fibers, carbon fibers, single-walled carbon nanotubes, multi-walled carbon nanotubes, and carbon nanohorns, metal fine powders or fibers of nickel, aluminum, and the like may be used.

The content of the powder electrode material is preferably 40 mass % or more in an electrode mixture for increasing an electrode capacity to be obtained.

The content of a solvent (dispersion medium), when a total mass of the slurry of the present disclosure is 100 mass %, is preferably 10 to 90 mass %. When a content of a solvent is less than 10 mass %, the binder, a positive electrode active material, and the like are not dissolved or dispersed in the solvent because the content of the solvent is excessively low, likely disturbing the formation of a layer forming a solid-state battery. Conversely, when a content of a solvent is more than 90 mass %, a weight (application) may be difficult to control because the content of the solvent is excessively high. The content of a solvent, when a total mass of the slurry is 100 mass %, is more preferably 15 to 70 mass %, and still more preferably 20 to 65 mass %. The solid content in the slurry is preferably 30 to 85 mass %.

In the present disclosure, the slurry is preferably prepared using the following procedures.

(1) The binder described above is added to a solvent to obtain a binder solution containing the binder;
(2) the binder solution obtained in (1) is added to the solvent together with the separately prepared oxide-based solid electrolyte, a positive electrode active material or a negative electrode active material to be used, and the solution is subjected to stirring treatment to obtain a "slurry for an electrode" in which the oxide-based solid electrolyte, the active material, and the binder are dissolved in the solvent. The solvent is further added and the slurry is subjected to dispersion treatment using a stirrer or the like to prepare a "slurry for an electrode" having a predetermined viscosity while the electrode active material, the oxide-based solid electrolyte, and the binder are highly dispersed in the solvent. In the step (2), the slurry may be a slurry to which a conductive aid is optionally added; and
(3) for forming a slurry for a solid electrolyte layer, the binder solution obtained in (1) is added to the solvent together with a separately prepared oxide-based solid electrolyte, and the solution is subjected to dispersion treatment using a stirrer or the like to obtain a "slurry for a solid electrolyte layer" in which the oxide-based solid electrolyte and the binder are highly dispersed in the solvent. The solvent is further added and the slurry is subjected to dispersion treatment using a stirrer or the like to prepare a "slurry for a solid electrode layer" having a predetermined viscosity in which the oxide-based solid electrolyte and the binder are highly dispersed in the solvent. In the step (3), the slurry may be a slurry to which a conductive aid is optionally added.

By thus adding stepwise the binder, the oxide-based solid electrolyte, and the optionally used electrode active material, and sequentially subjecting them to the dispersion treatment, it is possible to easily obtain a slurry in which the components are highly dispersed in the solvent. Similarly, when an optional component (such as a conductive aid) other than these components is to be added, it is preferable to add the component and sequentially subject the mixture to the dispersion treatment.

It should be noted, however, that a slurry can also be obtained by adding the binder, the oxide-based solid electrolyte, and the optionally used electrode active material, as well as an optional component to the solvent at once, and subjecting the mixture to the dispersion treatment at once.

The form of dispersion treatment may be, for example, the stirrer as described above. Other examples include dispersion with a homogenizer.

In the process of preparing the slurry, the mixture ratio of the binder, the oxide-based solid electrolyte, and the optionally used electrode active material may be any known mixture ratio that allows each of the formed layers to function appropriately.

It is particularly preferable to include 0.1 part by mass or more and 9.5 parts by mass or less of the binder, based on a total solids content of 100 parts by mass in the slurry. If the amount of the binder is excessively small, when an electrode is formed, the adhesion in the electrode layers as well as the adhesion between the electrode layer and a current collector may become poor, which may make handling of the electrode difficult. Conversely, if the amount of the binder is excessively large, the resistance of the electrode may increase, and a solid-state battery with sufficient performance may not be obtained.

In the process of preparing the slurry of the present disclosure, the amount of solids (the electrode active material, the oxide-based solid electrolyte, and the binder) in the solvent is preferable, for example, such that the solids content in the slurry is 30% by mass or more and 75% by mass or less, although not limited thereto. When the solids content falls in this range, an electrode can be produced more easily. The lower limit of the solids content is more preferably 50% by mass or more, and the upper limit is more preferably 70% by mass or less.

The slurry of the present disclosure can be used to form an electrode for a solid-state secondary battery and/or an oxide-based electrolyte layer for a solid-state secondary battery.

While the method for producing such an electrode for a solid-state secondary battery and/or an oxide-based electrolyte layer for a solid-state secondary battery is not limited, it may be produced by the following steps: (1) preparing a substrate; (2) preparing a slurry; and (3) applying the slurry to form an electrode for a solid-state secondary battery and/or an oxide-based electrolyte layer for a solid-state secondary battery.

The steps (1) to (3) will be hereinafter described in order.

Step (1): Preparing a Substrate

The substrate used herein is not limited as long as it has a flat surface such that the slurry can be applied thereto. The substrate may have a plate shape or a sheet shape. Alternatively, the substrate may be prepared in advance, or may be a commercial substrate.

The substrate used herein may be a substrate used in an oxide-based solid-state battery after the formation of the electrode for an oxide-based solid-state battery and/or an oxide-based electrolyte layer, or may be a substrate not used as a material for an oxide-based solid-state battery. Examples of the substrate used in an oxide-based solid-state battery include electrode materials such as a current collector; and materials for oxide-based solid electrolyte layers such as an oxide-based solid electrolyte membrane. The electrode for an oxide-based solid battery and/or an oxide-based electrolyte layer obtained using the slurry of the present disclosure may be used as a substrate, and additionally, an electrode for an oxide-based solid-state battery and/or an oxide-based electrolyte layer may be formed on the substrate.

Examples of the substrate not used as a material for an oxide-based solid-state battery include substrates for transferring such as a transfer sheet and a transfer substrate. The electrode for an oxide-based solid-state battery and/or an oxide-based electrolyte layer formed on a transfer substrate may be bonded by hot pressing or the like to an electrode for an oxide-based solid-state battery and/or an oxide-based electrolyte layer, and then the transfer substrate may be peeled off to form an electrode for an oxide-based solid-state battery on the oxide-based solid electrolyte layer.

The electrode layer for an oxide-based solid-state battery formed on a transfer substrate may be bonded by hot pressing or the like to a current collector, and then the transfer substrate may be peeled off to form an electrode for an oxide-based solid-state battery.

Step (2): Preparing a Slurry

This step can be conducted according to the method of preparing the slurry described above.

Step (3): Applying the Slurry to Form an Electrode for an Oxide-Based Solid-State Battery or an Oxide-Based Electrolyte Layer In this step, the slurry is applied to at least either one of the surfaces of the substrate to form an electrode for an oxide-based solid-state battery or an oxide-based electrolyte layer. The electrode for an oxide-based solid-state battery and/or an oxide-based electrolyte layer may be formed on only one surface of the substrate or on both surfaces of the substrate.

The slurry application method, drying method, and the like may be selected appropriately. Examples of the application method include spraying, screen printing, doctor blade, bar coating, roll coating, gravure printing, and die coating methods. Examples of the drying method include vacuum drying, heat drying, and vacuum heat drying. The conditions for vacuum drying or heat drying are not specifically restricted, and may be adjusted appropriately. Heat drying is preferably performed at a temperature not higher than the decomposition temperature of a binder. Such an operation enables the binder to sufficiently exhibit performance thereof. The decomposition temperature of a binder is defined as the pyrolysis temperature when a weight decrease is recorded at the time of increasing a temperature at a temperature-increasing rate of 10° C./min using a thermogravimetric analyzer [TGA] (Shimadzu Corporation), and a temperature at which 5 mass % has decreased.

While the amount of the slurry to be applied depends on the composition of the slurry, the purpose of the electrode for an oxide-based solid-state battery and/or an oxide-based electrolyte layer, and the like, it may be about 5 to 30 mg/cm$^2$ on a dry basis. The thickness of the electrode for an oxide-based solid-state battery and/or an oxide-based electrolyte layer may be about 10 to 300 μm, although not limited thereto.

The electrode for an oxide-based solid-state battery according to the present disclosure comprises the active material layer formed by the slurry for an electrode and may comprise a current collector and a lead connected to the current collector, in addition to the active material layer.

While the thickness of the active material layer used herein depends on the purpose of the oxide-based solid-state battery and the like, it is preferably 10 to 300 μm, particularly preferably 20 to 280 μm, and most preferably 30 to 250 μm.

The current collector used herein is not limited as long as it functions to collect electric current in the active material layer. Examples of materials of a current collector include aluminum, SUS, copper, nickel, iron, titanium, chromium, gold, platinum, and zinc, with aluminum and copper being preferable. Examples of shapes of the current collector include a foil shape, a plate shape, and a mesh shape, with the foil shape being preferable.

When the binder content in the electrode for an oxide-based solid-state battery according to the present disclosure is 0.5 to 9.5% by mass based on the electrode for an oxide-based solid-state battery (preferably the electrode active material layer), excellent adhesion is exhibited, and the oxide-based solid-state battery formed using the positive electrode exhibits high output.

The present disclosure also provides a solid-state secondary battery comprising the electrode for an oxide-based solid-state battery and/or an oxide-based electrolyte layer described above. The solid-state secondary battery is preferably a lithium-ion battery. The oxide-based solid-state secondary battery of the present disclosure is an oxide-based solid-state secondary battery comprising a positive electrode, a negative electrode, and an oxide-based solid electrolyte layer interposed between the positive electrode and the negative electrode, wherein the electrode for an oxide-based solid-state battery and/or the oxide-based electrolyte layer contains the binder of the present disclosure described above.

The FIGURE is a diagram showing one exemplary laminated structure of an oxide-based solid-state secondary battery according to the present disclosure. The FIGURE schematically shows a cross section cut in the laminated direction. It should be noted that the oxide-based solid-state secondary battery according the present disclosure is not limited to this example only.

The oxide-based solid-state secondary battery comprises a positive electrode 6 including a positive electrode active material layer 2 and a positive electrode current collector 4; a negative electrode 7 including a negative electrode active material layer 3 and a negative electrode current collector 5; and an oxide-based solid electrolyte layer 1 interposed between the positive electrode 6 and the negative electrode 7. Each of the positive electrode and the negative electrode used herein is the same as the electrode for an oxide-based solid-state battery described above. The following describes in detail the electrode and the oxide-based solid electrolyte layer used in the oxide-based solid-state secondary battery according to the present disclosure, as well as a separator and a battery case suitable for use in the oxide-based solid-state secondary battery according to the present disclosure.

The oxide-based solid-state secondary battery of the present disclosure may comprise a separator between the positive electrode and the negative electrode. Examples of the separator include porous membranes such as polyethylene and polypropylene; and nonwoven fabrics made of resins such as polypropylene, and nonwoven fabrics such as glass fiber nonwoven fabrics.

The oxide-based solid-state secondary battery of the present disclosure may further comprise a battery case. While the shape of the battery case used herein is not limited as long as it can house the positive electrode, the negative electrode, the oxide-based electrolyte layer, and the like described above, specific examples include a cylindrical shape, a rectangular shape, a coin shape, and a laminated shape.

The solid-state secondary battery of the present disclosure may be produced by, for example, preparing the oxide-based electrolyte layer; kneading the positive electrode or negative electrode active material, an oxide-based solid electrolyte, a binder, and a solvent to prepare a slurry; and forming the positive electrode by applying the slurry to one surface of the oxide-based electrolyte layer, and laminating the negative electrode on the other surface of the oxide-based electrolyte layer by applying the slurry, and pressing to produce an oxide-based solid-state secondary battery.

EXAMPLES

The present disclosure will be hereinafter described in detail based on examples. In the following examples, "part(s)" and "%" represent "part(s) by mass" and "% by mass", respectively, unless otherwise specified. All operations were conducted in atmosphere having a dew point of −60° C. or less.

(Method for Producing a Binder)

Binder 1 for Examples

A 3-L stainless steel autoclave was charged with 1,500 ml of pure water, 0.3001 g of a 50% aqueous solution of $CH_2=CFCF_2OCF(CF_3)CF_2OCF(CF_3)COONH_4$, and 6.001 g of a 50% aqueous solution of $C_5F_{11}COONH_4$ and nitrogen purged, slightly pressurized with vinylidene fluoride (VdF), and adjusted to a temperature of 80° C. with stirring at 600 rpm, and then VdF was added to a pressure of 1.22 MPa, and a monomer mixture at a molar ratio of VdF to 2,3,3,3-tetrafluoropropene of 77.2/22.8 was also added to a pressure of 1.501 MPa. 0.1 g of ammonium persulfate dissolved in 4 ml of pure water was added under nitrogen pressure to initiate polymerization. When the amount of the successive monomers reached 11 g, 1.6738 g of 1,1,1,2,3,3,3-heptafluoro-2-iodopropane was added. When the pressure decreased to 1.44 MPa, the pressure was increased to 1.50 MPa with the successive monomers. After this process was repeated for about 6.2 hours, 521 g of the successive monomers were charged, the autoclave was vented and cooled, and 2,087 g of a dispersion was collected. The solids content in the dispersion was 26.08%. This dispersion was coagulated by adding calcium chloride, and dried to obtain 524.3 g of a polymer. The polymer contained 2,3,3,3-tetrafluoropropene and VdF at a molar ratio of 23.1/76.9. The Mooney viscosity (ML1+10 (121° C.)) of the polymer was 25, and the Tg was determined as −14° C. by DSC.

Binder 2 for Examples

A 6-L stainless steel autoclave was charged with 3,500 ml of pure water, 0.7010 g of a 50% aqueous solution of $CH_2=CFCF_2OCF(CF_3)CF_2OCF(CF_3)COONH_4$, and 14.005 g of a 50% aqueous solution of $C_5F_{11}COONH_4$ and nitrogen purged, slightly pressurized with vinylidene fluoride (VdF), and adjusted to a temperature of 80° C. with stirring at 600 rpm, and then VdF was added to a pressure of 1.22 MPa, and a monomer mixture at a molar ratio of VdF to 2,3,3,3-tetrafluoropropene of 77.6/22.4 was also added to a pressure of 1.501 MPa. 0.23 ml of 2-methylbutane, and 0.775 g of ammonium persulfate dissolved in 10 ml of pure water were added under nitrogen pressure to initiate polymerization. The successive monomers were supplied in such a manner that the pressure was maintained at 1.5 MPa, and, after 4.8 hours at which time 400 g of the successive monomers were charged, the autoclave was vented and cooled, and 3,937 g of a dispersion was collected. The solids content in the dispersion was 10.79%. This dispersion was coagulated by adding aluminum sulfate, and dried to obtain 423 g of a polymer. The polymer contained 2,3,3,3-tetrafluoropropene and VdF in a molar ratio of 22.8/77.2. The Mooney viscosity (ML1+10 (140° C.)) of the polymer was 60, and the Tg was determined as −14° C. by DSC.

Binders 3 to 10 for Examples

Using the same method as above, polymer compositions were prepared to have the compositions of the binders 2 to 10 as shown in Table 1.

Binder 11 for Comparative Examples

KF7200 (Kureha) was used as the binder 11.

Binder 12 for Comparative Example

For binder 12, a 3-L stainless steel autoclave was charged with 1,716 ml of pure water, 0.3432 g of a 50% aqueous solution of $CH_2=CFCF_2OCF(CF_3)CF_2OCF(CF_3)COONH_4$, and 3.421 g of a 50% aqueous solution of $C_5F_{11}COONH_4$ and nitrogen purged, slightly pressurized with HFP, and adjusted to a temperature of 80° C. with stirring at 560 rpm, and then HFP was added to a pressure of 0.56 MPa, VdF was added to a pressure of 0.69 MPa, and a monomer mixture at a molar ratio of VdF to TFE to HFP of 70.2/11.3/18.5 was also added to a pressure of 2.000 MPa. 0.0218 g of ammonium persulfate dissolved in 4 ml of pure water was added under nitrogen pressure to initiate polymerization. When the amount of the successive monomers reached 12 g, 2.5022 g of 1-4-diiodoperfluorobutane was added. When the pressure decreased to 1.97 MPa, the pressure was increased to 2.03 MPa with the successive monomers. After this process was repeated for about 5.0 hours, 572 g of the successive monomers were charged, the autoclave was vented and cooled, and 2,302 g of a dispersion was collected. The solids content in the dispersion was 23.5%. This dispersion was coagulated by adding aluminum sulfate, and dried to obtain 571 g of a polymer. The polymer contained VdF to TFE to HFP at a molar ratio of 69.9/11.2/18.9. The Mooney viscosity (ML1+10 (121° C.)) of the polymer was 50, and the Tg was determined as −20° C. by DSC. Heat-of-fusion was not detected in the second run.

Binder 13 for Comparative Example

For binder 13, using the same method as the binder 12, a polymer composition was adjusted to have the composition of the binder 13 as shown in Table 1.

In examples, the content of each repeating unit is the value measured by the NMR method.

<Polymer Composition>

The composition of fluorine-containing elastomer was measured using the solution NMR method.

measurement apparatus: VNMRS400; Varian Inc.
resonance frequency: 376.04 (Sfrq)
pulse width: 30° (pw=6.8)

Table 1 below shows the binders used in the examples and comparative examples.

TABLE 1

|  | Composition | Composition molar ratio | Amount of Polar End Groups | Glass Transition Temperature [° C.] |
|---|---|---|---|---|
| Binder 1 | VdF/2,3,3,3-tetrafluoropropene | 77/23 | 0.01 | −14 |
| Binder 2 | VdF/2,3,3,3-tetrafluoropropene | 77/23 | 0.03 | −14 |
| Binder 3 | VdF/2,3,3,3-tetrafluoropropene | 77/23 | 0.05 | −14 |
| Binder 4 | VdF/2,3,3,3-tetrafluoropropene | 77/23 | 0.1 | −14 |
| Binder 5 | VdF/2,3,3,3-tetrafluoropropene | 80/20 | 0.05 | −17 |
| Binder 6 | VdF/2,3,3,3-tetrafluoropropene | 70/30 | 0.05 | −6 |
| Binder 7 | VdF/2,3,3,3-tetrafluoropropene | 70/30 | 0.15 | −6 |
| Binder 8 | VdF/2,3,3,3-tetrafluoropropene | 60/40 | 0.05 | 5 |
| Binder 9 | VdF/2,3,3,3-tetrafluoropropene/TFE | 77/18/5 | 0.03 | −20 |
| Binder 10 | VdF/2,3,3,3-tetrafluoropropene | 77/23 | below detection limit | −14 |
| Binder 11 | VdF | 100 | below detection limit | None |
| Binder 12 | VdF/TFE/HFP | 70/12/18 | below detection limit | −20 |
| Binder 13 | VdF/HFP | 78/22 | below detection limit | −18 |

Examples 1 to 10, 13 to 15 and Comparative Examples 1 to 3

The binder shown in Table 1 was dissolved in N-methylpyrrolidone (hereinafter, NMP) to prepare an 8% binder solution.

0.35 g of acetylene black as a conductive aid and 0.3 g of the binder solution on a solid content basis were added and stirred. After cooled with ice for 2 minutes, a powder obtained by mixing 6.8 g of a solid electrolyte $Li_7La_3Zr_2O_{12}$ (hereinafter, LLZ) and 13.28 g of a positive electrode active material ($LiNi_{0.6}Mn_{0.2}Co_{0.2}O_2$ (lithium nickel manganese cobalt oxide [NMC]) was added and stirred again. Then, 3.5 g of NMP was added again, and stirred again.

Example 11

The binder shown in Table 1 was dissolved in NMP to prepare an 8% binder solution.

10.4 g of a solid electrolyte LLZ and 0.21 g of the binder solution on a solid content basis were added, stirred, and cooled with ice while in a container.

Example 12

The binder 1 was dissolved in NMP to prepare an 8% binder solution.

6.8 g of a solid electrolyte LLZ, 13.5 g of artificial graphite as a negative electrode active material, and 0.41 g of the binder solution on a solid content basis were added and stirred. The obtained solution was cooled with ice for 2 minutes while in a container, and then stirred again.

Evaluation Method

After antigelation properties and slurry preparation were adjusted, the presence or absence of the gelation in a stationary state was visually observed over the course of time. The slurry gelated and lost fluidity was rated as poor, whereas the slurry that maintained fluidity was rated as good. Table 2 collectively shows the results.

| | Binder | Active material | Slurry condition | | | | | | |
|---|---|---|---|---|---|---|---|---|---|
| | | | 0 h | 1 h | 3 h | 5 h | 10 h | 48 h | 96 h |
| Example 1 | Binder 1 | $LiNi_{0.6}Mn_{0.2}Co_{0.2}O_2$ | good | good | good | good | good | good | good |
| Example 2 | Binder 2 | $LiNi_{0.6}Mn_{0.2}Co_{0.2}O_2$ | goad | good | good | good | good | good | good |
| Example 3 | Binder 3 | $LiNi_{0.6}Mn_{0.2}Co_{0.2}O_2$ | good | good | good | good | good | good | good |
| Example 4 | Binder 4 | $LiNi_{0.6}Mn_{0.2}Co_{0.2}O_2$ | good | good | good | good | good | good | good |
| Example 5 | Binder 5 | $LiNi_{0.6}Mn_{0.2}Co_{0.2}O_2$ | good | good | good | good | good | good | poor |
| Example 6 | Binder 6 | $LiNi_{0.6}Mn_{0.2}Co_{0.2}O_2$ | good | good | good | good | good | good | good |
| Example 7 | Binder 7 | $LiNi_{0.6}Mn_{0.2}Co_{0.2}O_2$ | good | good | good | good | good | good | good |
| Example 8 | Binder 8 | $LiNi_{0.6}Mn_{0.2}Co_{0.2}O_2$ | good | good | good | good | good | good | poor |
| Example 9 | Binder 9 | $LiNi_{0.6}Mn_{0.2}Co_{0.2}O_2$ | good | good | good | good | good | good | poor |
| Example 10 | Binder 10 | $LiNi_{0.6}Mn_{0.2}Co_{0.2}O_2$ | good | good | good | good | good | good | good |
| Example 11 | Binder 1 | — | good | good | good | good | good | good | good |
| Example 12 | Binder 1 | Artificial graphite | good | good | good | good | good | good | poor |
| Example 13 | Binder 1:Binder 11 = 5:5 | $LiNi_{0.6}Mn_{0.2}Co_{0.2}O_2$ | good | good | good | good | good | poor | poor |
| Example 14 | Binder 1:Binder 12 = 5:5 | $LiNi_{0.6}Mn_{0.2}Co_{0.2}O_2$ | good | good | good | good | good | poor | poor |
| Example 15 | Binder 1:Binder 13 = 5:5 | $LiNi_{0.6}Mn_{0.2}Co_{0.2}O_2$ | good | good | good | good | good | poor | poor |
| Comparative Example 1 | Binder 11 | $LiNi_{0.6}Mn_{0.2}Co_{0.2}O_2$ | good | poor | poor | poor | poor | poor | poor |
| Comparative Example 2 | Binder 12 | $LiNi_{0.6}Mn_{0.2}Co_{0.2}O_2$ | good | good | poor | poor | poor | poor | poor |
| Comparative Example 3 | Binder 13 | $LiNi_{0.6}Mn_{0.2}Co_{0.2}O_2$ | good | good | poor | poor | poor | poor | poor |

The results in Table 2 show that when the binder of the present disclosure is used, a satisfactory slurry can be obtained without gelation.

Electrode were prepared using prepared slurries.

(Preparation of a Negative Electrode)

The slurry for a negative electrode prepared in Example 12 was applied onto a copper foil as a negative electrode current collector using a doctor blade, and dried at 100° C. for 10 minutes. Then, the slurry was dried for 12 hours in a vacuum dryer at 70° C. to obtain a negative electrode in which a negative electrode layer with a thickness of 100 μm was formed on the surface of the negative electrode current collector. Such an active material layer was free of any issue when visually observed, thereby forming a satisfactory membrane.

(Preparation of a Positive Electrode)

The slurry for a positive electrode prepared in Example 5 was applied onto an aluminum foil as a positive electrode current collector using a doctor blade, and dried at 100° C. for 10 minutes. Then, the slurry was dried for 12 hours in a vacuum dryer at 70° C. to obtain a positive electrode in which a positive electrode layer with a thickness of 90 μm was formed on the surface of the positive electrode current collector. Such an active material layer was free of any issue when visually observed, thereby forming a satisfactory membrane.

(Preparation of a Solid Electrolyte Layer)

The electrolyte slurry prepared in Example 11 was applied onto a releasable substrate (PET foil) using a doctor blade, and dried at 100° C. for 20 minutes. Then, the slurry was dried for 12 hours in a vacuum dryer at 70° C. to form a solid electrolyte layer with a thickness of 205 μm on the substrate. Such a solid electrolyte layer was free of any issue when visually observed, thereby forming a satisfactory membrane.

INDUSTRIAL APPLICABILITY

The binder of the present disclosure is used for the production of a solid-state secondary battery. More specifically, the binder can be used for the formation of each layer forming a solid-state secondary battery. The binder of the present disclosure enables to provide a larger-sized solid-state secondary battery at low cost and efficiently.

REFERENCE SIGNS LIST

1: oxide-based solid electrolyte layer
2: positive electrode active material layer
3: negative electrode active material layer
4: positive electrode current collector
5: negative electrode current collector
6: positive electrode
7: negative electrode

What is claimed is:

1. A slurry for a solid-state secondary battery, the slurry comprising:
   an oxide-based solid electrolyte, and
   a binder,
   wherein the binder comprises a fluorine-containing polymer comprising a vinylidene fluoride unit and a fluorinated monomer unit other than the vinylidene fluoride unit, wherein the fluorinated monomer unit is at least one copolymerization unit (A) selected from the group consisting of a monomer unit having a structure represented by formula (1) and a monomer unit having a structure represented by formula (2):

wherein $Rf_1$ and $Rf_2$ are each a linear or branched fluorinated alkyl or fluorinated alkoxy group with 1 to 12 carbon atoms, which optionally contains an oxygen atom between carbon-carbon atoms when the number of carbon atoms is 2 or more.

2. The slurry for a solid-state secondary battery according to claim 1, wherein the oxide-based solid electrolyte contains lithium.

3. The slurry for a solid-state secondary battery according to claim 1, wherein the oxide-based solid electrolyte is an oxide having a crystal structure.

4. The slurry for a solid-state secondary battery according to claim 1, wherein a molar ratio of the vinylidene fluoride unit/the copolymerization unit (A) is 87/13 to 20/80.

5. The slurry for a solid-state secondary battery according to claim 1, wherein the fluorine-containing polymer has a glass transition temperature of 25° C. or less.

6. The slurry for a solid-state secondary battery according to claim 1, wherein the binder is a fluorine-containing copolymer containing a vinylidene fluoride unit, the fluorinated monomer unit having a structure represented by the formula (1), and a further monomer unit copolymerizable with these units, wherein the molar ratio of the vinylidene fluoride unit/the fluorinated monomer unit is 87/13 to 20/80, and the further monomer unit constitutes up to 50 mol % of total monomer units.

7. The slurry for a solid-state secondary battery according to claim 1, wherein the oxide-based solid electrolyte is an oxide having a crystal structure selected from the group consisting of a perovskite oxide, an NASICON oxide, and a garnet oxide.

8. An electrode for a solid-state secondary battery comprising an active material layer formed from the slurry for a solid-state secondary battery according to claim 1, and an active material.

9. An oxide-based solid electrolyte layer for a solid-state secondary battery formed from the slurry for a solid-state secondary battery according to claim 1.

10. A solid-state secondary battery comprising the electrode for a solid-state secondary battery according to claim 8.

11. A solid-state secondary battery comprising the oxide-based solid electrolyte layer for a solid-state secondary battery according to claim 9.

12. A method for forming a layer for a solid-state secondary battery comprising:
   applying a slurry onto a substrate and heat drying,
   wherein the slurry is the slurry for a solid-state secondary battery according to claim 1.

13. The method for forming a layer for a solid-state secondary battery according to claim 12, wherein the heat drying is conducted at a temperature not higher than a decomposition temperature of the binder.

* * * * *